United States Patent Office 2,921,302
Patented Jan. 12, 1960

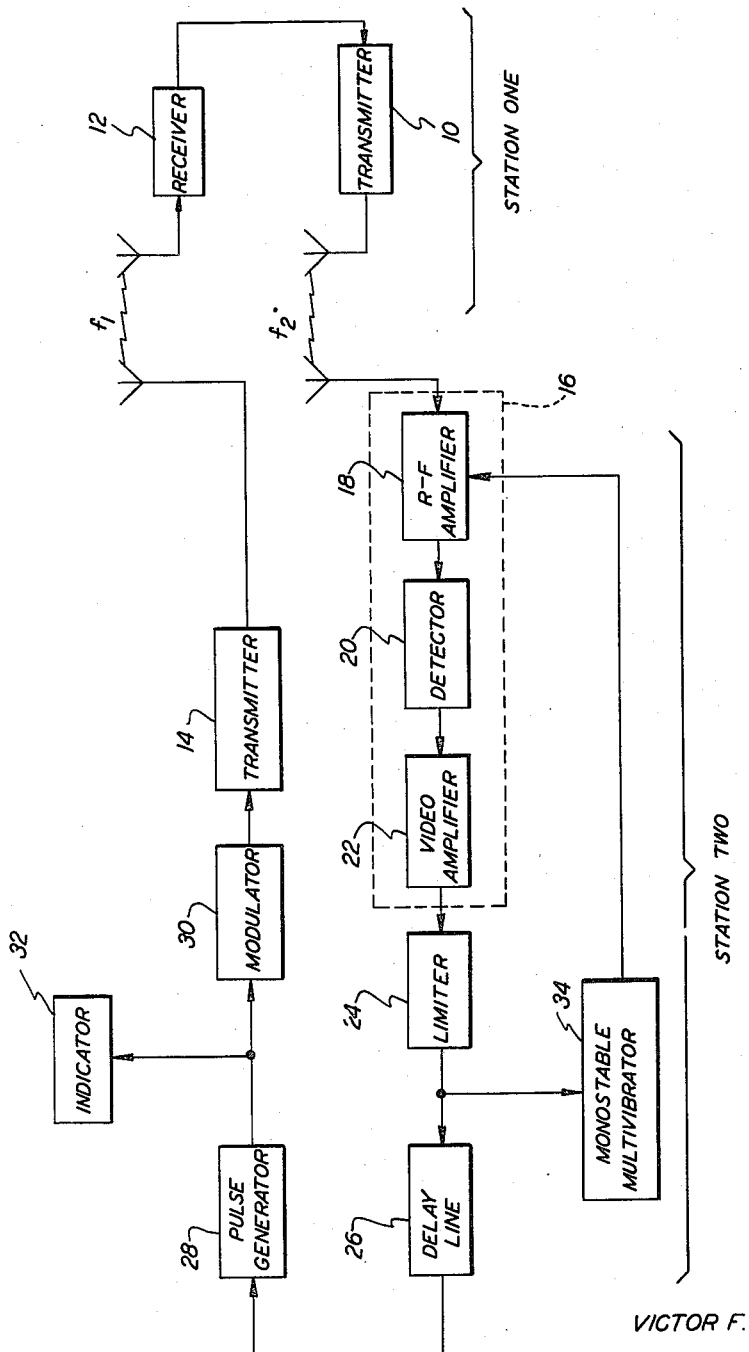

2,921,302
MODE SILENCER FOR A CLOSED LOOP TRANSMISSION SYSTEM

Victor F. Cartwright, Pasadena, Calif., assignor to Ralph M. Parsons Company, Pasadena, Calif., a corporation of Nevada Application August 9, 1956, Serial No. 603,071

6 Claims. (Cl. 343—7.5)

This invention relates to improved distance measuring apparatus and, more particularly, is concerned with mode suppression in a regenerative closed loop transmission system.

Distance measuring equipment has heretofore been proposed which is based on the well-known "singing frequency" principle in which two pulse transponders located at two separated points cooperate in such a manner that a space-coupled oscillator is created. The frequency of oscillation is a function of transponder separation and is measured to derive an indication of the distance between the transponders. Such a system is described in detail in my copending application Serial Number 596,246, filed July 6, 1956.

In such a system there are a number of frequencies which are harmonics of each other at which oscillation can take place around the closed loop transmission path. It is therefore desirable to provide means in such a system to insure that the fundamental singing frequency is measured for any given distance between the transponders. It has heretofore been proposed to utilize a low pass filter in the closed loop transmission path to attenuate all frequencies except the fundamental. Generally where such a system is to be operated over an extensive range of distances, the filter must be designed with a fairly sharp cut-off to distinguish the fundamental frequency at the shorter ranges and the first harmonic frequency at the longer ranges. The difficulty with using any type of mode suppression which discriminates on the basis of frequency, such as a low pass filter or similar device which provides variable attenuation with frequency, is that such devices introduce variable phase shift as a function of frequency. Therefore, the total delay around the transmission loop is varied not only by the change in propagation path length between the transponders but also by the frequency at which the closed loop transmission path is caused to ring. It is highly desirable for the sake of calibrating the system in terms of distance that the only variable delay in the system be produced by the variations in propagation path length between the transponders.

The present invention is an improvement on the prior art practices in that it provides suppression which does not depend on attenuating the higher modes on the basis of frequency. Rather, the present invention selects the fundamental mode from other harmonics on the basis of a predetermined minimum time delay around the closed path.

In brief, the present invention provides distance measuring apparatus involving transponders at two separated stations, the transponders being intercoupled on two channels of different carrier frequency. Means are provided for generating a pulse which is transmitted around the closed loop path as modulation on the respective carrier signals in the two channels. One of the transponders includes a detector, a fixed delay network and an amplifier. A monostable multivibrator having a period slightly less than the fixed delay is triggered by the detected modulating pulse, the output of the monostable multivibrator being used to bias off the amplifier for a fixed interval. With the amplifier biased off the closed loop is effectively open-circuited during an interval corresponding to the fixed delay. This prevents the closed loop from oscillating at any frequency higher than the frequency occurring at zero range between the transponders.

For a better understanding of the invention reference should be had to the accompanying drawing in which the single figure is a block diagram of the distance measuring system incorporating the improvement of the present invention.

In the drawing, the station 1 is shown as comprising a transmitter 10 having an output carrier frequency of $f_2$ which, for example, may be of the order of 291 megacycles. The transmitter 10 is directly modulated by the output of the receiver 12 that is tuned to a frequency $f_1$ which, for example, may be of the order of 255 megacycles. The transmitter 10 and receiver 12 may be of conventional transponder design well known in the communications art. The transponder is preferably designed with small gain and negligible phase shift so as to introduce substantially no time delay in the transmission loop.

The transponder at station 1 cooperates with a similar transponder at station 2 which includes a transmitter 14. The transmitter 14 is designed to transmit on the carrier frequency $f_1$. The transponder further includes a receiver 16 which is tuned to receive carrier signals of the carrier frequency $f_2$. The receiver 16 is preferably designed to include a tuned radio frequency (R-F) amplifier section 18, a detector 20 and a class $A_x$ video amplifier 22. The R-F amplifier section should be provided with automatic gain control to compensate for the wide variation in signal strength occurring with changes in distance between the target and missile transponder. Further, the automatic gain control should maintain substantially constant phase shift of the receiver over a wide range of input signal amplitude.

The demodulated output of the receiver 16 is fed into a voltage limiter 24, the output of which is coupled by means of a fixed delay circuit 26 to a pulse generator 28. The generator 28 may, for example, be a monostable multivibrator having a one microsecond recovery time. Thus, a one microsecond pulse is fed to a modulator 30 on the input of the transmitter 14 in response to a received signal at the receiver 16.

It will be seen from the description thus far that the two transponders form a closed loop transmission path which, due to the gain in the receiver 16, may be made regenerative. This regenerative or ringing frequency has a fundamental frequency value determined by the time delay around the loop. By virtue of the pulse generator 20, the regenerated signal is in the form of a pulse modulation on the respective carriers between the two transponders.

The total time delay around the closed loop is made up primarily of two factors, namely, the fixed time delay introduced by the time delay circuit 26 and the propagation time delay resulting from the spacing between the two stations. The fixed time delay establishes the minimum ringing frequency, corresponding to zero range between the transponders. It is preferably set at a value equal to or slightly greater than the delay due to propagation time at the maximum range at which the system is designed to operate. A time delay of 20 microseconds has been found preferable.

Coupled to the output of the pulse generator 28 at station 2 is a suitable indicator for indicating the repetition frequency of the output of the pulse generator 28. Alternatively, the indicator may provide an indication of the time interval between output pulses from the generator 28. In either event the indicator can be calibrated directly in units of distance between the two stations. While the indicator 32 is shown coupled to the output of the pulse generator 28, it will be appreciated that a frequency or period measurement can be made any place around the closed loop, and in fact, can be made at a remote point by means of a receiver tuned to either the frequency $f_1$ or $f_2$. One suitable distance indicating system is shown in my copending application Serial Number 596,246, filed July 6, 1956.

In order to derive an accurate measurement of distance, it is necessary to measure accurately the time delay around the closed loop. As pointed out above, this can be done either by measuring the repetition frequency of or the time interval between pulses from the pulse generator 28. However, to derive an accurate measurement of distance, it is necessary to know if the pulse generator is putting out pulses at intervals corresponding to the total time delay around the closed loop or at some harmonic thereof. It is possible, in the absence of means for suppressing the higher order modes, for the closed loop path to oscillate at a number of harmonics of the fundamental frequency.

Unwanted modes are suppressed according to the present invention by means of a monostable multivibrator 34 coupled to the output of the limiter 24. The monostable multivibrator 34 is triggered on by the demodulated pulse from the output of the receiver 16, and triggers itself off after a predetermined time interval. The monostable multivibrator is coupled to the R-F amplifier 18 and is arranged to bias off one or more stages of the R-F amplifier 18 during the time interval in which the monostable multivibrator is triggered on. The on time of the monostable multivibrator is designed to be substantially equal to or slightly less than the time delay of the delay circuit 26.

It will be seen that the effect of the monostable multivibrator is to open-circuit the closed loop transmission path as soon as a modulation pulse is received at the output of the receiver 16. The closed loop path is again closed at a time interval later which is slightly less than the delay around the closed loop at zero range between the two stations. Thus, the maximum frequency at which the closed loop can oscillate is the fundamental ringing frequency corresponding to zero range between the two stations. The range between the stations can be increased until the propagation time between the stations is substantially equal to the fixed delay time of the delay circuit 26 before the closed loop path can be caused to oscillate at the second harmonic of the ringing frequency. The delay time of the delay circuit 26 is therefore, as pointed out above, chosen to be slightly greater than the propagation time delay at the maximum range at which the distance measuring system is designed to operate.

From the above description it will be seen that an improved distance measuring system is provided of the "ringing frequency" closed loop type in which the ringing frequency is a direct measure of the distance between transponders forming the closed loop transmission path. The invention specifically provides improved means for eliminating or silencing unwanted higher order modes of oscillation of the closed loop circuit. The mode silencing means, by operating solely on a time basis, provides on-off control rather than attenuation as a function of frequency, as provided by the more conventional low-pass filter type of mode suppression. The mode silencer of the present invention has the advantage that it does not introduce a time delay in the system which is variable with the ringing frequency.

I claim:

1. Apparatus for measuring the distance between remote relatively movable first and second stations comprising a transmitter at the first remote station and a receiver at the second remote station operating on a first carrier frequency, a transmitter at the second remote station and a receiver at the first remote station operating on a second carrier frequency, means for modulating the carrier from one of said transmitters with a pulse, means at the first station for coupling the output of the receiver to the input transmitter including a detector, a fixed delay network, and an amplifier, means at the second station for coupling the output of the receiver thereof to the input of the transmitter including a detector and an amplifier, means in said first station including a monostable multivibrator for generating a rectangular pulse having a duration slightly less than said fixed delay, said means being triggered by the detected modulating pulse, means for biasing off the amplifier in response to the rectangular pulse to suppress unwanted modes in the closed loop formed by the two remote stations, and means responsive to the total time for the pulse to recirculate around the closed loop for indicating the distance between the remote stations.

2. Apparatus for measuring the distance between remote relatively movable first and second stations comprising a transmitter at the first remote station and a receiver at the second remote station operating on a first carrier frequency, a transmitter at the second remote station and a receiver at the first remote station operating on a second carrier frequency, means for modulating the carrier from one of said transmitters with a pulse, means at the first station for coupling the output of the receiver to the input transmitter including a detector, a fixed delay network, and an amplifier, means at the second station for coupling the output of the receiver thereof to the input of the transmitter, means in said first station including a monostable multivibrator for generating a rectangular pulse having a duration slightly less than said fixed delay, said means being triggered by the detected modulating pulse, and means for biasing off the amplifier in response to the rectangular pulse to suppress unwanted modes in the closed loop formed by the two remote stations.

3. Apparatus for measuring the distance between remote relatively movable first and second stations comprising a transmitter at the first remote station and a receiver at the second remote station operating on a first carrier frequency, a transmitter at the second remote station and a receiver at the first remote station operating on a second carrier frequency, means for modulating the carrier from one of said transmitters with a pulse, means at the first station for coupling the output of the receiver to the input transmitter including a detector, a fixed delay network, and an amplifier, means at the second station for coupling the output of the receiver thereof to the input of the transmitter, means in said first station for generating a rectangular pulse having a duration slightly less than said fixed delay, said means being triggered by the detected modulating pulse, and means for biasing off the amplifier in response to the rectangular pulse to suppress unwanted modes in the closed loop formed by the two remote stations.

4. Apparatus for measuring the distance between remote relatively movable first and second stations comprising a transmitter at the first remote station and a receiver at the second remote station operating on a first carrier frequency, a transmitter at the second remote station and a receiver at the first remote station operating on a second carrier frequency, means for modulating the carrier from one of said transmitters with a pulse, means at the first station for coupling the output of the receiver to the input transmitter including a detector, a fixed delay network, and an amplifier, means at the second station for coupling the output of the receiver thereof to the input of the transmitter, means in said first station for biasing off the amplifier for a period substantially equal to said fixed delay in response to said modulation pulses to suppress unwanted modes in the closed loop formed by the two remote stations.

5. Apparatus for measuring the distance between remote relatively movable first and second stations comprising a transmitter at the first remote station and a receiver at the second remote station operating on a first carrier frequency, a transmitter at the second remote station and a receiver at the first remote station operating on a second carrier frequency, means for generating a pulse for transmission around the closed loop transmission path formed by the two remote stations, means at the first station for coupling the output of the receiver to the input transmitter including a fixed delay network, means at the second station for coupling the output of the receiver thereof to the input of the transmitter, means at one of the stations for detecting the transmission of the pulse past a particular point in the closed-loop transmission path at said one of the stations, and means responsive to said detecting means for interrupting transmission of a pulse around the loop for a period substantially equal to the fixed delay of said network, said last-named means interrupting transmission at a point in the loop at said one of the stations immediately preceding the point where the pulse is detected by said detecting means.

6. Apparatus for measuring the distance between remote relatively movable first and second stations comprising a transponder at the first remote station and a transponder at the second remote station, the transponders forming a regenerative closed loop transmission path, means for generating a pulse for transmission around said closed loop transmission path, one of said transponders including a fixed delay network, means at one of the transponders for detecting the transmission of the pulse past a particular point in the closed loop transmission path at said one of the transponders, and means responsive to said detecting means for open-circuiting the closed loop for a period substantially equal to the fixed delay of said network, said last-named means providing an open-circuit at a point in said one of the transponders immediately preceding the point where the pulse is detected by said detecting means.

References Cited in the file of this patent

UNITED STATES PATENTS

| | | |
|---|---|---|
| 2,454,772 | Chatterjea et al. | Nov. 30, 1948 |
| 2,776,449 | Mitchell | Oct. 9, 1956 |

FOREIGN PATENTS

| | | |
|---|---|---|
| 133,807 | Australia | July 8, 1948 |